(12) United States Patent
Posch et al.

(10) Patent No.: US 8,569,412 B2
(45) Date of Patent: Oct. 29, 2013

(54) HETEROPHASIC POLYPROPYLENE COPOLYMER COMPOSITION

(75) Inventors: Werner Posch, Enns (AT); Michael Tranninger, Pucking (AT); Pauli Leskinen, Helsinki (FI); Bo Malm, Espoo (FI); Sybille Simon, Linz (AT); Norbert Reichelt, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/261,048

(22) PCT Filed: Jun. 15, 2010

(86) PCT No.: PCT/EP2010/058357
§ 371 (c)(1),
(2), (4) Date: Nov. 29, 2011

(87) PCT Pub. No.: WO2010/149529
PCT Pub. Date: Dec. 29, 2010

(65) Prior Publication Data
US 2012/0190784 A1      Jul. 26, 2012

(30) Foreign Application Priority Data
Jun. 22, 2009   (EP) .................................... 09163353

(51) Int. Cl.
*C08K 3/26* (2006.01)

(52) U.S. Cl.
USPC ........... 524/427; 524/445; 524/449; 524/451; 524/494; 524/495; 524/496

(58) Field of Classification Search
USPC .......... 524/427, 445, 449, 451, 494, 495, 496
See application file for complete search history.

(56) References Cited

U.S. PATENT DOCUMENTS

2008/0033104 A1* 2/2008 Grein et al. .................... 524/584

FOREIGN PATENT DOCUMENTS

| | | |
|---|---|---|
| EP | 0491566 A2 | 6/1992 |
| EP | 1236769 A1 | 9/2002 |
| EP | 1344793 A1 | 9/2003 |
| EP | 1477525 A1 | 11/2004 |
| EP | 1538167 A1 | 6/2005 |
| EP | 1600480 A1 | 11/2005 |
| EP | 1607440 A1 | 12/2005 |
| WO | 8707620 A1 | 12/1987 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2005118712 A1 | 12/2005 |
| WO | 2009129873 A1 | 10/2009 |

OTHER PUBLICATIONS

International Search Report and Written Opinion for Application No. PCT/EP2010/058357 Completed on Aug. 11, 2010.

* cited by examiner

*Primary Examiner* — Peter Szekely
(74) *Attorney, Agent, or Firm* — Warn Partners, P.C.

(57) ABSTRACT

Heterophasic polypropylene composition comprising (A) 45 to 70 wt % of a propylene homo- or copolymer matrix with an $MFR_2$ in accordance with ISO 1133 (230° C., 2.16 kg load) of ≥80 g/10 min and (B) 25 to 40 wt % of an elastomeric propylene-ethylene copolymer, having an intrinsic viscosity IV (ISO 1628, with decalin as solvent) of ≥3.3 dl/g and an ethylene content of 20 to 50 wt %, (C) 0-15 wt % of an elastomeric ethylene/alpha-olefin random copolymer (D) 3-25 parts per weight of inorganic filler, the heterophasic polypropylene compositions having a total $MFR_2$ (230° C./2.16 kg) in accordance with ISO 1133 of ≥5 g/10 min, a Charpy notched impact strength according to ISO 179/1eA at +23° C. of ≥15.0 kJ/m2, preferably ≥25.0 $kJ/m^2$, a minimum value for the Charpy notched impact strength according to ISO 179/1eA at −200 C of ≥7.0 kJ/m2, preferably ≥10.0 $kJ/m^2$ and a tensile modulus according to ISO 527-3 of ≥1200 MPa; their preparation and use for producing injection molded articles being free of flow marks.

4 Claims, 1 Drawing Sheet

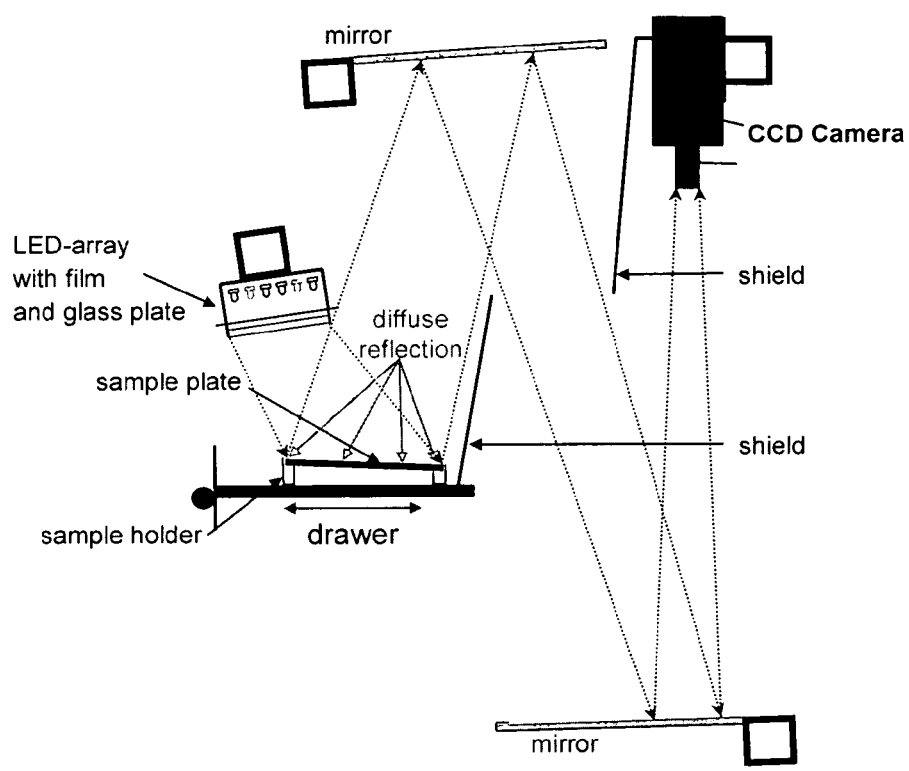
Measurement setup

HETEROPHASIC POLYPROPYLENE COPOLYMER COMPOSITION

This application is a National Stage of International Application No. PCT/EP2010/058357, filed Jun. 15, 2010. This application claims priority to European Patent Application No. 09163353.7, filed on Jun. 22, 2009. The disclosures of the above applications are incorporated herein by reference.

The present invention relates to heterophasic polypropylene copolymer composition. The inventive heterophasic polypropylene copolymer compositions are especially suited for the automotive applications because they have excellent impact strength/stiffness balance, high flowability and are not susceptible to the occurrence of flow marks. Furthermore, the present invention relates to a process for the production of such copolymers as well as to their use.

Heterophasic polypropylene copolymer compositions, which typically comprise polypropylene and an elastomer, have many desirable properties, e.g. lightweight, durability, low costs, etc. that make them an attractive material of construction for many interior and exterior automotive parts.

Normally such compositions are injection moulded into the desired articles. If the articles are relatively large, such as for example automobile bumpers, instrument panels or centre-consoles, the problem of optical irregularity arises, due to the necessary long flow paths of the resin.

Such surface defects, which are also known as "Tiger-stripes" or flow marks, are a common problem for surface quality respectively appearance in plastic industry. Tiger-stripes, as known in the plastic industry, describe a visible periodic inhomogeneity in surface gloss. Mostly these are alternating dull (or rough) and glossy (or smooth) areas on the surface of injection molded or extruded plastic parts, which surface should be glossy (or smooth) all over.

Many attempts to avoid these surface defects, while keeping a good balance of other physical properties have been made in the past.

For example WO 2004/000899 describes polyolefins on the basis of a polypropylene matrix material including bimodal rubber compositions, whereby the two rubber parts have differentiated Mw (respectively intrinsic viscosity IV) and the low IV rubber is ethylene rich. These polyolefins are produced in a multistage process comprising at least one slurry reactor and two gas phase reactors. A particularly preferred catalyst system is, according to WO 2004/000899, a high yield Ziegler-Natta catalyst having a catalyst component, a cocatalyst and optionally an external donor, or a metallocene catalyst, having a bridged structure giving high stereoregularity and which, as an active complex, is impregnated on a carrier. The polymers produced according to WO 2004/000899 show improved surface toughness in terms of scratch resistance and can be used for producing car interiors and exteriors, like bumpers, dashboards and the like, where improved scratch resistance properties are needed.

The main disadvantage of bimodal rubbers is product inconsistency due to migration which leads to surface deposits.

Furthermore, if such materials are used for painted applications, the low IV fraction influences the steam jet performance negatively as the material delaminates more easily.

From experience it is known that Reactor-grade Thermoplastic Olefins (RTPOs), produced according to WO 2004/000899 show flow marks.

EP 1 600 480 describes an improved propylene polymer composition on the basis of a polypropylene matrix material with an MFR in accordance with ISO 1133 (230° C., 2.16 kg) 80 g/10 min, including bimodal rubber compositions, whereby the two rubber parts have differentiated Mw (IV) and the low IV rubber is ethylene rich.

The propylene polymer composition is mixed with an elastomeric ethylene-1-octene copolymer, having an ethylene content of at least 80 mol % and having an MFR in accordance with ISO 1133 (190° C., 2.16 kg) of 3-100 g/10 min, and with an inorganic filler. These propylene polymer compositions are, according to EP 1 600 480, suitable for automotive applications because they have excellent impact strength/stiffness balance, high flowability and are not susceptible to the occurrence of flow marks.

The RTPO is produced in a multistage process using a Ziegler-Natta catalyst. According to the examples ZN104 (commercially available from LyondellBasell), triethylaluminium as cocatalyst and dicyclopentyldimethoxysilane as external donor are used.

According to the Examples of EP 1 600 480 MFR-values of at most 100 g/10 min for the propylene matrix can be achieved by using this combination of catalyst, cocatalyst and external donor, limiting the overall processability of the related compositions.

EP 1 236 769 describes a heterophasic propylene polymer composition comprising the following components:

i) 60 to 90 wt %, relative to the total weight of components i), ii) and iii), of a propylene polymer matrix comprising a propylene homopolymer and, optionally, a propylene copolymer, said propylene polymer matrix having an ethylene content of no more than 5 wt %;

ii) 5 to 30 wt %, relative to the total weight of components i), ii) and iii), of an elastomer; and iii) 5 to 25 wt %, relative to the total weight of components i), ii) and iii), of an ethylene copolymer plastomer having a density of not more than 910 kg/m$^3$ and a melt flow rate MFR$_{2.16}$ (190° C.) of at least 0.5 g/10 minutes at 190° C. under a weight of 2.16 kg.

The elastomer is preferably a propylene-ethylene copolymer containing 25 to 45 wt % ethylene and having an intrinsic viscosity (IV of AM) of 1.5 to 4 dL/g, preferably 2 to 3.5 dL/g measured in decalin at 135° C. according to ASTM method D1601-78.

The plastomers used in the present invention may be produced for example by metallocene-catalyzed polymerization or other single site catalyzed polymerization.

Such compositions show decreased stress whitening, but no indication of good surface structure and avoiding tiger-stripes formation is given.

EP 1 344 793 claims a polyolefin composition with high impact strength and high gloss, comprising A) a heterophasic propylene copolymer containing
a) 50-95 wt % of a matrix phase comprising a propylene homopolymer or a propylene copolymer with up to 5 mol % of ethylene and/or at least one $C_4$-$C_8$-α-olefin and
b) 5-50 wt % of a disperse phase comprising an ethylene rubber copolymer with from 20-80 mol % ethylene and from 80-20 mol % of at least one $C_3$-$C_8$-α-olefin and where the intrinsic viscosity of the XCS-fraction of the heterophasic copolymer is ≤2 dl/g and
B) a β-nucleating agent.

As experience has shown, β-nucleation limits the processing window and temperature resistance. Furthermore an IV <2 of the disperse phase is negative for notched impact strength and additionally automotive industry requires low gloss.

EP 1 607 440 describes a polypropylene composition comprising a heterophasic propylene copolymer, an elastomeric copolymer and inorganic filler and a method for producing the propylene composition using peroxides. The composition is characterised by a combination of excellent impact strength, stiffness, elasticity and surface stability having i.a. a Charpy notched impact strength according to ISO 179/1eA at +23° C. of ≥55.0 kJ/m2 and a tensile modulus according to ISO 527-3 of ≥1200 MPa.

As is known by art skilled persons visbreaking with peroxides reduces especially stiffness and secondly has very negative influence on emission, fogging and odour.

WO 00/68315 describes i.a. the preparation of a nucleated high-stiffness heterophasic propylene polymer composition in a two-stage polymerization process using a catalyst system comprising a catalyst component, a cocatalyst component and an external donor, said catalyst being modified by polymerizing it with a vinyl compound in the presence of a cocatalysts and an external donor, which is according to the examples preferably dicyclopentyldimethoxysilane. Such heterophasic copolymers can have a polypropylene homopolymer matrix with a $MFR_2$ (230° C./2.16 kg) in accordance with ISO 1133 in the range of 0.01 to 1500 g/min, preferably 0.05 to 500 g/min. According to the only example of the application referring to heterophasic polypropylene the intrinsic viscosity of the rubber is 4.1 dl/g, the amount of the rubber phase is 21.7 wt %.

It has however, been found, that either the occurrence of flow marks could not be entirely prevented, or the physical properties of the polymer compositions were unsatisfactory.

For these reasons, although much development work has been done in the field of heterophasic polypropylene copolymer compositions there is a continuous need for alternative or improved heterophasic polypropylene copolymer compositions, which can be injection moulded into large articles, which articles show no flow marks and which compositions simultaneously show an improved impact strength/stiffness balance.

The new compositions shall be used for injection moulding, therefore the $MFR_2$ (230° C./2.16 kg) in accordance with ISO 1133 of the compositions is preferred to be ≥5 g/10 min. A Charpy notched impact strength according to ISO 179/1eA at +23° C. of ≥15.0 $kJ/m^2$.

The minimum value for the Charpy notched impact strength according to ISO 179/1eA at –20° C. is ≥7.0 $kJ/m^2$. Stiffness is considered to be high with tensile moduli according to ISO 527-3 of ≥1200 MPa. Still higher values are of course more preferable. The surface quality of injection moulded parts, which is determined according to the procedure described in the experimental section, must be "excellent", i.e. only polymer compositions which can be injection moulded without showing any flow marks, solve the problem which is underlying the present invention.

The above object was achieved with a polypropylene polymer composition comprising
(A) 45 to 70 wt % of a propylene homo- or copolymer matrix with an $MFR_2$ in accordance with ISO 1133 (230° C., 2.16 kg load) of ≥80 g/10 min and
(B) 25 to 40 wt % of an elastomeric propylene-ethylene copolymer, having an intrinsic viscosity IV (ISO 1628, with decalin as solvent) of ≥3.3 dl/g and an ethylene content of 20 to 50 wt %,
C) 0-15 wt % of an elastomeric ethylene/alpha-olefin random copolymer
D) 3-25 wt % of inorganic filler,
the heterophasic polypropylene compositions having a total $MFR_2$ (230° C./2.16 kg) in accordance with ISO 1133 of ≥5 g/10 min, a Charpy notched impact strength according to ISO 179/1eA at +23° C. of ≥15.0 $kJ/m^2$, preferably ≥25.0 $kJ/m^2$, a minimum value for the Charpy notched impact strength according to ISO 179/1eA at –20° C. of ≥7.0 $kJ/m^2$, preferably ≥10.0 $kJ/m^2$ and a tensile modulus according to ISO 527-3 of ≥1200 MPa.

Furthermore the heterophasic polypropylene compositions according to the present invention show high flowability, measured with the spiral flow test at 230° C., as described in the experimental part in detail.

The polypropylene matrix (A) can be a propylene homopolymer, a propylene copolymer or mixtures thereof, like a homo/random copolymer. However, it is preferred that the polypropylene matrix (A) is a propylene homopolymer.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Where the polypropylene matrix (A) comprises a propylene copolymer or is a homo/random propylene copolymer, the propylene copolymer comprises monomers copolymerizable with propylene, for example comonomers such as ethylene and $C_4$ to $C_{20}$ alpha-olefins, in particular ethylene and $C_4$ to $C_{10}$ alpha-olefins, e.g. 1-butene or 1-hexene. The comonomer content in the propylene matrix is in such a case preferably relatively low, i.e. up to 6.0 wt %, more preferably 1.0 to 6.0 wt %, still more preferably 1.0 to 4.0 wt %, yet more preferably 1.0 to 3.0 wt %.

The polypropylene matrix (A) is preferably unimodal, but can also be multimodal, like bimodal. Concerning the definition of unimodal and multimodal, like bimodal, it is referred to the definition below.

For achieving injection moulded parts free of flow marks, it is essential, that the $MFR_2$ in accordance with ISO 1133 (230° C., 2.16 kg load) of the propylene matrix (A) is ≥80 g/10 min. Preferably the propylene matrix (A) has an $MFR_2$ (230° C.)≥100 g/10 min, more preferably 110 g/10 min and most preferably ≥120 g/10 min. The $MFR_2$ (230° C.) can be up to 500 g/10 min.

As a further requirement of the heterophasic polypropylene copolymer the elastomeric copolymer must fulfill some properties so that the desired results can be achieved.

Accordingly the elastomeric copolymer (B) must comprise propylene and at least ethylene and may comprise a further other $C_4$ to $C_{10}$ alpha-olefin selected from the group consisting of 1-butene, 1-pentene, 1-hexene, 1-heptene and 1-octene. However, it is in particular preferred that the elastomeric copolymer (B) comprises, more preferably consists of, propylene and ethylene as the only polymerizable units.

Furthermore the elastomeric propylene-ethylene copolymer (B) must comprise ethylene in a content of 20 to 50 wt %, preferably 30 to 40 wt %.

In addition the elastomeric propylene-ethylene copolymer (B) must have an intrinsic viscosity IV (ISO 1628, with decalin as solvent) of ≥3.3 dl/, preferably ≥3.5 dl/g, more preferably ≥4.0 dl/g and most preferably ≥4.5 dl/g.

The elastomeric propylene-ethylene copolymer (B) will constitute 25 to 40 wt %, preferably 28 to 40 wt % and more preferably 30 to 40 wt % of the heterophasic polymer composition.

As third component the polymer composition includes 0 to 15 wt %, preferably 1 to 10 wt %, based on the weight of the polymer composition, of an ethylene/alpha-olefin random copolymer. Preferred ethylene/alpha-olefin random copolymers are elastomeric ethylene/$C_4$ to $C_8$ alpha olefin copolymers, like ethylene-1-butene copolymers, ethylene-1-hexene copolymers or ethylene-1-octene copolymers. More preferred ethylene/alpha-olefin random copolymers are ethylene-1-butene copolymers and ethylene-1-octene copolymers. Most preferably ethylene-1-octene copolymers are used.

The production of elastomeric ethylene-1-octene copolymers is described in detail in: Chum S P, Kao Cl and Knight G W: Structure, properties and preparation of polyolefins produced by single-site technology. In: Metallocene based Polyolefins—Volume 1, Scheirs J and Kaminsky W Eds, John Wiley and Sons Ltd, Chichester (West Sussex, England), 2000 pp. 262-264.

Alternatively, elastomeric ethylene-1-octene copolymers, which are commercially available can be used.

In a preferred embodiment ethylene-1-octene copolymers having an octene content of at least 20 wt %, preferably of about 25-50 wt %, more preferably 30-45 wt %, a melt index MI (ASTM D-792; 190° C., 2.16 kg) of 0.3-30 g/10 min, preferably 0.5 to 5 g/10 min and a density of <880 kg/m$^3$ (according to ASTM D-792).

Finally, the polypropylene polymer composition of the present invention comprises filler, in particular inorganic filler. Suitable inorganic fillers are talc, chalk, clay, mica, clay or glass fibres and carbon fibres up to a length of 6 mm.

The mean particle size d50 of the filler may be chosen between 0.5 to 40 μm, preferably between 0.7 to 20 μm and more preferably between 1.0 to 10 μm.

The mean (or median) particle size is the particle diameter where 50% of the particles are larger and 50% are smaller. It is denoted as the d50 or $D_{50}$.

In principle, this value may be determined by any particle measuring techniques, for example measuring techniques based on the principle of light diffraction.

Other techniques for determining particle sizes include, for example, granulometry in which a uniform suspension of a small quantity of the powder to be investigated is prepared in a suitable dispersion medium and is then exposed to sedimentation. The percentage distribution of the particle sizes can be estimated from the correlation between size and density of the spherical particles and their sedimentation rate as determined by Stokes law and the sedimentation time. Other methods for determining particle size include microscopy, electron microscopy, sieve analysis, sedimentation analysis, determination of the surface density and the like.

The particle size data appearing in the present specification were obtained in a well known manner with a standard test procedure employing Stokes' Law of Sedimentation by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; website: www.micromeritics.com), referred to herein as a "Micromeritics Sedigraph 5100 unit".

Preferably talc is used as inorganic filler.

Before the talc is added it may be treated with various surface treatment agents, such as organic titanate coupling agents, silane coupling agents, fatty acids, metal salts of fatty acids, fatty acid esters, and the like, in a manner known in the state of the art. The talc may also be added without surface treatment.

Preferably the talc is added without surface treatment.

The amount of filler added to the heterophasic polymer composition is about 3 to 25 wt %, preferably 5 to 15 wt %, based on the weight of the polymer composition.

The above combination of polypropylene polymer, elastomeric copolymers and filler is preferred for especially high levels of impact strength/stiffness levels, combined with absolutely flow mark free injection moulded parts.

The expressions "multimodal" or "bimodal" or "unimodal" used herein refers to the modality of the polymer, i.e. the form of its molecular weight distribution curve, which is the graph of the molecular weight fraction as a function of its molecular weight. As will be explained below, the polymer components of the present invention are produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution of the final polymer, that curve may show two or more maxima or at least be distinctly broadened when compared with curves for the individual fractions.

According to the present invention the heterophasic propylene copolymer discussed above is produced in a multistage process, wherein the polypropylene matrix (A) is produced at least in one slurry reactor and subsequently the elastomeric copolymer (B) is produced at least in one gas phase reactor.

A preferred multistage process is a slurry-gas phase process, such as developed by Borealis and known as the Borstar® technology. In this respect, reference is made to EP 0 887 379, WO 2004/000899, WO 2004/111095, WO 99/24478, WO 99/24479 and WO 00/68315 incorporated herein by reference.

Preferably the heterophasic propylene copolymers with high levels of impact strength/stiffness levels, combined with absolutely flow mark free injection moulded parts according to the invention are produced in a multistage process by using a special Ziegler-Natta procatalyst in combination with an external donor and a cocatalyst, as described below in detail.

Such a multistage process preferably comprises the steps of:
producing a polypropylene polymer matrix (A) in the presence of a catalyst system, as described in detail below, comprising a special Ziegler-Natta procatalyst in combination with the external donor and the cocatalyst in at least one slurry reactor
transferring the slurry reactor product into a first gas phase reactor (GPR),
wherein the slurry reactor product is further polymerized in the presence of the catalyst system in said first GPR
transferring the first GPR product into a $2^{nd}$ GPR
producing an ethylene/propylene-copolymer (B) in the polymer matrix (A) in the presence of the catalyst system in said $2^{nd}$ GPR
transferring the $2^{nd}$ GPR product into a $3^{rd}$ GPR and further producing an ethylene/propylene-copolymer (B) in the polymer matrix (A) in the presence of catalyst system in said $3^{rd}$ GPR, said ethylene/propylene copolymers having the same composition ratios and
recovering the polymer product for further processing, yielding a polypropylene polymer matrix (A) containing said ethylene/propylene copolymers (B) having the same composition ratios, respectively having same ethylene content and intrinsic viscosities, so that a unimodal rubber composition is obtained.

Preferably the process comprises also a prepolymerization step with the chosen catalyst system, as described in detail below, comprising the special Ziegler-Natta procatalyst, the external donor and the cocatalyst.

In a preferred embodiment, the prepolymerization is conducted as bulk slurry polymerization in liquid propylene, i.e.

the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt % monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

With respect to the above-mentioned preferred slurry-gas phase process, the following general information can be provided with respect to the process conditions.

Temperature of from 40° C. to 110° C., preferably between 50° C. and 100° C., in particular between 60° C. and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor, wherein the temperature preferably is within the range of from 50° C. to 130° C., more preferably 60° C. to 100° C., at a pressure in the range of from 5 to 50 bar, preferably 8 to 35 bar, again with the option of adding hydrogen in order to control the molecular weight in a manner known per se.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the heterophasic polypropylene copolymers are obtainable by a multistage polymerization process, as described above, in the presence of a catalyst system comprising
(i) a modified Ziegler-Natta procatalyst which contains a trans-esterification product of a lower alcohol and a phthalic ester and
(ii) an organometallic cocatalyst and
(iii) an external donor The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

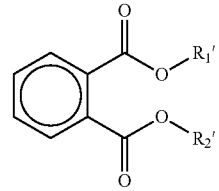

(I)

wherein $R_1'$ and $R_2'$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of
adding to said titanised carrier
(i) a dialkylphthalate of formula (I) with $R_1'$ and $R_2'$ being independently at least a $C_5$-alkyl, like at least a $C_8$-alkyl,
or preferably
(ii) a dialkylphthalate of formula (I) with $R_1'$ and $R_2'$ being the same and being at least a $C_5$-alkyl, like at least a $C_8$-alkyl
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product
subjecting said first product to suitable transesterification conditions, i.e. to a temperature between 100 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

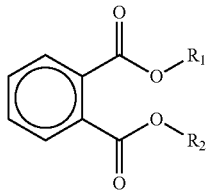

(II)

with $R_1$ and $R_2$ being methyl or ethyl, preferably ethyl, the dialkylphthalat of formula (II) being the internal donor and recovering said transesterification product as the procatalyst composition.

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

The transesterification is performed at a temperature above 100° C., advantageously between 130 to 150° C.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5% by weight of titanium at the most, preferably 2.2% by weight at the most and more preferably 2.0% by weight at the most. Its donor content is preferably between 4 to 12% by weight and more preferably between 6 and 10% by weight.

More preferably the procatalyst used according to the invention has been produced by using ethanol as the alcohol and dioctylphthalate (DOP) as dialkylphthalate of formula (I), yielding diethyl phthalate (DEP) as the internal donor compound (prepared according to WO92/19653 as disclosed in WO 99/24479; especially with the use of dioctylphthalate as dialkylphthalate of formula (I) according to WO 92/19658) or the catalyst Polytrack 8502, commercially available from Grace.

The Ziegler-Natta procatalyst is modified by polymerizing a vinyl compound in the presence of the catalyst system, comprising the special Ziegler-Natta procatalyst, an external donor and optionally a cocatalyst, which vinyl compound has the formula:

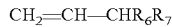

wherein $R_6$ and $R_7$ together form a 5- or 6-membered saturated, unsaturated or aromatic ring or independently represent an alkyl group comprising 1 to 4 carbon atoms, and the modified catalyst is used for the preparation of the polymer composition. The polymerized vinyl compound can act as a nucleating agent.

The following specific examples of vinyl compounds can be mentioned: vinyl cycloalkanes, in particular vinyl cyclohexane (VCH), vinyl cyclopentane, vinyl-2-methyl cyclohexane and vinyl norbornane, 3-methyl-1-butene, styrene, p-methyl-styrene. 3-ethyl-1-hexene or mixtures thereof. VHC is particularly preferred.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic propylene copolymers according to the invention the catalyst system used comprises in addition to the special Ziegler-Natta procatalyst an organometallic cocatalyst as component (ii). Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

wherein $R^1$ and $R^2$ can be the same or different a represent a hydrocarbon group having 1 to 12 carbon atoms.

$R^1$ and $R^2$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^1$ and $R^2$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^1$ and $R^2$ are an ethyl group.

Most preferably diethylaminotriethoxysilane is used as external donor.

The external donor may be produced according to the methods disclosed in EP 1538 167.

The content of this document is herein included by reference.

The external donor may also be represented by the formula (IV)

wherein $R_3$ and $R_4$ are identical or different hydrocarbon residues, $R_5$ is methyl or ethyl, z is 2 or 3, preferably 2; m is 0 or 1; n is 0 or 1; with the proviso that n+m+z=4.

Preferably $R_3$ and $R_4$ are independently selected from the group consisting of linear aliphatic hydrocarbon group, branched aliphatic hydrocarbon group, cyclic aliphatic hydrocarbon group and aromatic group. It is in particular preferred that $R_3$ and $R_4$ are independently selected from the group consisting of methyl, ethyl, propyl, butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. In a preferred embodiment the external donor has the formula V

wherein $R_3$ and $R_4$ are identical or different hydrocarbon residues, with the proviso that
(a) $R_3$ is a branched aliphatic hydrocarbon group or cyclic aliphatic hydrocarbon group, preferably selected from the group consisting of iso-propyl, iso-pentyl, tert.-butyl, tert.-amyl, neopentyl, cyclopentyl, cyclohexyl, methylcyclopentyl and cycloheptyl, and
(b) $R_4$ is selected from the group consisting of linear aliphatic hydrocarbon group, branched aliphatic hydrocarbon group and cyclic aliphatic hydrocarbon group, preferably selected from the group consisting of methyl, ethyl, propyl, butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

Accordingly it is preferred that the external donor is selected from the group consisting of di-iso-propyldiethoxysilane (DI P DES), cyclohexylmethyldiethoxysilane (CH MDES), dicyclopentyldimethoxysilane (DCPDMS), cyclohexylmethyl-dimethoxysilane (CHMDMS) and dicyclopentadienyldiethoxysilane (DCPDES). More preferably an external donor selected from DCPDMS-donor, CHMDMS-donor and di-iso-propyldiethoxysilane (DIPDES) is used and most preferably the DCPDMS-donor is used.

The current invention also provides a multistage process as described above for producing to the polypropylene matrix (A), containing the elastomeric copolymer (B) using the special catalyst system comprising components (i), (ii) and (iii).

Components (C) and (D) of the heterophasic polymer composition according to the invention are added to the polypropylene matrix (A), containing the elastomeric copolymer (B) which is collected from the final reactor of the series of reactors.

The heterophasic polymer composition of the invention may further contain various conventional additives, such as antioxidants, UV-stabilizers, acid scavengers, lubricants, demoulding agents, nucleating agents, colouring agents, etc. in an amount of 0.001 to 10 wt. %, preferably up to 5.0 wt % and more preferably up to 3.0 wt % based on the weight of the heterophasic polypropylene composition.

Components (C) and (D) and the optional additives are mixed into the composition prior to or during the extrusion process in a one-step compounding process. Alternatively, a master batch may be formulated, wherein the heterophasic propylene copolymer is first mixed with only some of the additives.

For mixing, a conventional compounding or blending apparatus, e.g. a Banbury mixer, a t-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive heterophasic propylene copolymers.

Heterophasic polypropylene compositions according to the invention may be pelletized and compounded using any of the variety of compounding and blending methods well known and commonly used in the resin compounding art.

The compositions of the current invention are preferably used for the production of moulded articles, preferably injection moulded articles. Even more preferred is the use for the production of automotive parts, like bumpers, spoilers, fenders, body panels, side bump strips and the like.

The current invention also provides articles comprising the inventive heterophasic polypropylene compositions with high levels of impact strength/stiffness levels, combined with absolutely flow mark free injection moulded parts. Preferably, these articles are produced by injection moulding.

Surprisingly, it was found that the molded articles manufactured with the heterophasic polypropylene compositions prepared according to the invention display excellent surface quality.

The surface quality of injection molded parts, which is determined according to the procedure described in the experimental section, must be "excellent", i.e. only polymer compositions which can be injection molded without showing any flow mark, solve the problem which is underlying the present invention.

In the following the present invention is further illustrated by means of examples.
Methods:
a) Melt Flow Rate Unless otherwise specified, the melt flow rate was measured as the $MFR_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

b) Comonomer content was measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800-650 $cm^{-1}$) was measured with Perkin Elmer FTIR 1600 spectrometer. The method was calibrated by ethylene content data measured by $^{13}$C-NMR.

c) Flexural modulus was measured according to ISO 178 by using injection molded test specimens as described in EN ISO 1873-2 (80×10×4 mm)

d) Tensile Modulus

The tensile modulus was measured according to ISO 572-3 at 1 mm/min and 23° C. Test specimens as described in EN ISO 1873-2 (80×10×4 mm) were used.

e) Xylene Solubles

The xylene soluble fraction (XS) as defined and described in the present invention was determined as follows: 2.0 g of the polymer were dissolved in 250 mm p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 mm flasks. The solution from the first 100 mm vessel was evaporated in nitrogen flow and the residue dried under vacuum at 90° C. until constant weight is reached. The xylene soluble fraction (percent) can then be determined as follows:

$$XS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter).

f) Intrinsic Viscosity (IV)

The intrinsic viscosity (IV) value increases with the molecular weight of a polymer. The IV values e.g. of the amorphous phase were measured according to ISO 1628/1 (October 1999) in Decalin at 135° C.

g) Charpy Notches Impact Strength (NIS),

NIS was determined according to ISO 179-1eA:2000 on V-notched samples of 80×10×4 $mm^3$ at +23° C. (Charpy notched impact strength (23° C.)), and −20° C. (Charpy notched impact strength (−20° C.)). The test specimens were prepared by injection moulding using a IM V 60 TECH machinery in line with ISO 1872-2. The melt temperature was 200° C. and the mold temperature was 40° C.

h) Flow Properties (Spiral Flow at 230° C.)

Spiral Test was carried out using an Engel ES330/65 cc90 injection molding apparatus with a spiral mould and pressure of 1000 MPa
screw diameter: 35 mm
max. piston displacement: 150 cm$^3$
spec. injection pressure: 1000 MPa
tool form: oval form; provided by Axxicon (Axxicon ISO std. AIM tool with Axxicon oval spiral mould insert); thickness 2 mm, breadth: 5 mm
temperature in pre-chamber and die: 230° C.
temperature in zone 2/zone 3/zone 4/zone 5: 230° C./230° C./225° C./200° C.
injection cycle: injection time including holding: 15 s
cooling time: 15 s
injection pressure: Follows from the predetermined length of the testing material.
dwell pressure=injection pressure
screw speed: 30 rpm
metering path: Metering stroke should be set so the screw stops 20 mm before final position by end of the holding pressure.
tool temperature: 40° C.

The spiral flow length can be determined immediately after the injection operation.

EXAMPLES

Preparation of Base Resins A, B and C According to the Invention and as Comparative Examples Base Resins D and E The inventive and comparative examples were prepared in a connected series of reactors. The Base resins A, B, C, D and E were produced using Borstar® technology in a plant having a prepolymerization reactor, a loop reactor and three fluid bed gas-reactors connected in series. The catalyst used in the polymerization was a Vinylcyclohexyl (VHC)-modified catalyst prepared according to Example 1 of WO99/24479, the cocatalyst was Triethylaluminium (TEA) and as an external donor ED dicyclopentyl dimethoxy silane was used.

After a first pre-polymerization step the catalyst system was fed to the slurry reactor, where the polymerization of the polypropylene homopolymer matrix phase was initiated. The slurry phase loop reactor was then followed by a first gas phase reactor (1$^{st}$ GPR) in series, in which the matrix phase of the polypropylene homopolymer was completed. After transfer to a second gas phase reactor (2$^{nd}$ GPR) the elastomeric rubber disperse phase was produced by copolymerization of propylene with ethylene comonomer. The reaction product of the second gas phase reactor was then transferred into a third gas phase reactor (3$^{rd}$ GPR) wherein the ethylene/propylene copolymer was completed.

The reaction conditions are summarized in Table 1. Table 2 summarizes the relevant properties of the base resins A, B, C, D and E

TABLE 1

| Reaction conditions: | | | | | |
|---|---|---|---|---|---|
| | Base resin | | | | |
| | A | B | C | D | E |
| 1. Prepolymerization | | | | | |
| T [° C.] | 25 | 25 | 25 | 25 | 25 |
| Al/ED [mol/mol] | 9.3 | 10.1 | 10.2 | 20.0 | 19.8 |

TABLE 1-continued

| Reaction conditions: | | | | | |
|---|---|---|---|---|---|
| | Base resin | | | | |
| | A | B | C | D | E |
| Al/Ti [mol/mol] | 361 | 475 | 354 | 425 | 466 |
| TEA/C$_3$ [g/t] | 199.7 | 200 | 200 | 149.8 | 196.8 |
| Catalyst feed [g/h] | 2.04 | 1.81 | 2.42 | 1.5 | 1.84 |
| ED feed [g/t C$_3$] | 40.1 | 40 | 39.9 | 15 | 20.2 |
| Pressure [bar] | 55 | 55 | 55 | 55 | 55 |
| H$_2$ feed [g/h] | 2.85 | 2.93 | 3.32 | 2.84 | 3.36 |
| Residence time [h] | 0.33 | 0.33 | 0.33 | 0.36 | 0.33 |
| 2. Loop | | | | | |
| T [° C.] | 85 | 85 | 85 | 85 | 85 |
| Pressure [bar] | 55 | 55 | 55 | 55 | 55 |
| H$_2$/C$_3$ [mol/kmol] | 27.4 | 27.4 | 26.4 | 11.1 | 35.3 |
| C$_3$ feed [kg/h] | 199.1 | 197.2 | 197.1 | 196 | 197.9 |
| Residence time [h] | 0.35 | 0.34 | 0.35 | 0.56 | 0.50 |
| 3. 1$^{st}$ GPR | | | | | |
| T [° C.] | 85 | 85 | 85 | 85 | 85 |
| Pressure [bar] | 20 | 20 | 20 | 26 | 20 |
| H$_2$/C$_3$ [mol/kmol] | 168 | 163 | 166 | 75 | 111 |
| C$_2$ [wt %] | 0 | 0 | 0 | 0 | 0 |
| C$_3$ feed [kg/h] | 46.6 | 46.7 | 46.5 | 51.2 | 47.4 |
| Residence time [h] | 1.5 | 1.5 | 1.5 | 1.6 | 1.4 |
| Split Loop/1$^{st}$ GPR | 46.5/53.5 | 49.4/50.6 | 47.9/52.1 | 46.8/53.2 | 49.4/50.6 |
| 4. 2$^{nd}$ GPR | | | | | |
| T [° C.] | 80 | 80 | 80 | 80 | 80 |
| Pressure [bar] | 23 | 25 | 29 | 27 | 21 |
| H$_2$/C$_3$ [mol/kmol] | 22.2 | 7.5 | 21.6 | 125 | 30 |
| C$_2$ [wt %] | 7.9 | 6.7 | 7.4 | 5.2 | 7.2 |
| C$_2$/C$_3$ [mol/kmol] | 495 | 504 | 503 | 457 | 482 |
| C$_3$ feed [kg/h] | 80 | 80 | 80 | 50 | 80 |
| Residence time [h] | 1.67 | 1.97 | 2.43 | 1.34 | 1.62 |
| 5. 3$^{rd}$ GPR | | | | | |
| T [° C.] | 85 | 85 | 85 | 80 | 85 |
| Pressure [bar] | 29 | 31 | 28 | 29 | 25 |
| H$_2$/C$_2$ [mol/kmol] | 57 | 12 | 0 | 231 | 61 |
| C$_2$ [wt %] | 16 | 14.6 | 14.3 | 11.1 | 12 |
| C$_2$/C$_3$ [mol/kmol] | 502 | 484 | 497 | 438 | 589 |
| C$_3$ feed [kg/h] | 80 | 80 | 80 | 60 | 80 |
| Residence time [h] | 0.87 | 0.94 | 0.78 | 0.87 | 0.88 |
| Split 2$^{nd}$ GPR/3$^{rd}$ GPR | 51.3/48.7 | 0.8/99.2 | 19.6/80.4 | 52.6/47.4 | 61.2/38.8 |

TABLE 2

| Analytics and mechanics of base resins | | | | | |
|---|---|---|---|---|---|
| | Base resin | | | | |
| | A | B | C | D | E |
| MFR$_2$-Matrix [g/10 min] | 121 | 122 | 126 | 34 | 57 |
| MFR$_2$-total [g/10 min] | 11.6 | 7.9 | 6.9 | 12.9 | 9.6 |
| XS [wt %] | 36.8 | 31.8 | 30.7 | 28.9 | 31.4 |
| C$_2$-total [wt %] | 14.1 | 15.1 | 14.6 | 11.5 | 13.6 |
| C$_2$/XS [wt %] | 37.2 | 38.2 | 38.0 | 34.5 | 37.0 |
| IV/XS [dl/g] | 3.3 | 4.9 | 7.1 | 1.8 | 3.0 |
| Tensile modulus [MPa] | 962 | 951 | 952 | 1127 | 994 |
| Charpy NIS 1eA +23° C. [kJ/m$^2$] | 25.2 | 23.3 | 25.1 | 26.8 | 55.5 |
| Charpy NIS 1eA −20° C. [kJ/m$^2$] | 10.5 | 10.1 | 10.8 | 7.2 | 9.9 |
| Flow length, 1000 MPa [mm] | 1158 | 1140 | 1055 | 1102 | 1085 |

Testing of Base Resins

Base resins A, B, C, D and E were initially obtained in powder form.

The Base resins were mixed with talc HM2 (from IMI) as Component D and Engage 8150 (from Dow) as Component C, as well as with, HC001A-B1 (propylene homopolymer with a density of 905 kg/m³ and an MFR (2.16 kg, 230° C.) of 3.2 g/10 min. It is distributed by Borealis), AO200 (antioxidant: Irgafos 168 (FF) from Ciba Specialty Chemicals and carbon black (plasblak PE4103, polyethylene based masterbatch for injection moulding applications containing carbon black from Cabot).

The mixtures were compounded by feeding the components to a Prism 24twin-screw extruder (Prism Ltd., Staffordshire, UK). The material was then extruded through a strand die, cooled and chopped to form pellets.

TABLE 3 compounded resins

| | Base resin | | | | |
|---|---|---|---|---|---|
| | A | B | C | D | E |
| [wt %] Base resin | 86.5 | 81.5 | 80.5 | 78.5 | 81 |
| Talc [wt %] | 10 | 10 | 10 | 10 | 10 |
| Engage 8150 [wt %] | 0 | 5 | 6 | 8 | 9.5 |
| HC001A-B1[wt %] | 1.93 | 1.93 | 1.93 | 1.93 | 1.93 |
| AO200 [wt %] | 0.07 | 0.07 | 0.07 | 0.07 | 0.07 |
| PE4103 [wt %] | 1.5 | 1.5 | 1.5 | 1.5 | 1.5 |

TABLE 4

Properties of compounded resins A-E

| | Base resin | | | | |
|---|---|---|---|---|---|
| | A | B | C | D | E |
| Total rubber content [wt %] | 31.8 | 30.9 | 30.7 | 30.7 | 30.9 |
| MFR-total [g/10 min] | 10.25 | 5.99 | 5.35 | 10.4 | 7.76 |
| Tensile Modulus [MPa] | 1393 | 1243 | 1232 | 1215 | 1289 |
| Charpy NIS 1eA +23° C. [kJ/m²] | 15.5 | 29.4 | 41.9 | 46.9 | 40.5 |
| Charpy NIS 1eA −20° C. [kJ/m²] | 7.3 | 10.5 | 9.7 | 7.5 | 8.6 |
| Flow length, 1000 MPa [mm] | 1490 | 1190 | 1130 | 975 | 990 |

Surface Quality (Flow Marks or Tigerskin):

An optical measurement system, as described for example by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:
1. Image Recording:

The basic principle of the measurement system is to illuminate the plates with a defined light source (LED) in a closed environment and to record an image with a CCD-camera system.

A Schematic Setup is Given in FIG. 1.
2. Image Analysis:

The specimen is floodlit from one side and the upwards reflected portion of the light is deflected via two mirrors to a CCD-sensor. The so created grey value image is analyzed in lines. From the recorded deviations of grey values the mean square error (MSE) is calculated allowing a quantification of surface quality, i.e. the larger the MSE value the more pronounced is the surface defect.

Table 5 provides an overview of MSE-values and the corresponding visual ranking of the surface quality of injection moulded grained plaques.

According to the visual ranking judged visually by a tester the tigerskin level was assessed by a number between 0 (no flow mark "excellent") and 5 (flow marks are visible, "insufficient").

TABLE 5

MSE-values and corresponding visual ranking of surface quality

| MSE value | Visual ranking |
|---|---|
| 0 < MSE < 7 | 0 |
| 7 < MSE < 11 | 1 |
| 11 < MSE < 16 | 2 |
| 16 < MSE < 22.5 | 3 |
| 22.5 < MSE < 30 | 4 |
| 30 < MSE | 5 |

For this evaluation plaques 210×148×3 mm³ with grain VW K50 and a filmgate of 1.4 mm were used and was produced with five different flow front velocities: 25, 50, 100, 133, 200 mm/s.
Further Conditions:
Melt temperature: 240° C.
Mould temperature 30° C.
Dynamic pressure: 10 bar hydraulic Table 6 shows the MSE-values for the resins A, B, C, D and E

TABLE 6

MSE-values

| | Flow front velocity [mm/sec] | | | | |
|---|---|---|---|---|---|
| | 25 | 50 | 100 | 133 | 200 |
| Base polymer A | 1.6 | 1.4 | 1.7 | 2.4 | 3.2 |
| Base polymer B | 1.2 | 1.2 | 1.4 | 1.5 | 1.6 |
| Base polymer C | 1.3 | 1.4 | 1.5 | 1.5 | 1.6 |
| Comparative D | 4.7 | 17.1 | 80.7 | 122.3 | 128.3 |
| Comparative E | 1.6 | 1.9 | 10 | 20.1 | 22.7 |

We claim:
1. Process for the preparation of heterophasic polypropylene compositions, comprising the steps of:
producing a polypropylene polymer matrix (A) in the presence of a catalyst system comprising a Ziegler-Natta procatalyst in combination with an external donor and a cocatalyst in at least one slurry reactor
transferring the slurry reactor product into a first gas phase reactor (GPR),
(i) a Ziegler-Natta procatalyst which contains a transesterification product of a lower alcohol and a phthalic ester as internal donor and
(ii) an organometallic cocatalyst and
(iii) an external donor represented by formula (III)

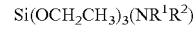

wherein $R^1$ and $R^2$ can be the same or different a represent a hydrocarbon group having 1 to 12 carbon atoms or formula (IV)

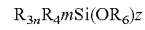

wherein $R_3$ and $R_4$ are identical or different hydrocarbon residues, $R_5$ is methyl or ethyl, z is 2 or 3; m is 0 or 1; n is 0 or 1; with the proviso that n+m+z=4,
said procatalyst being modified by polymerizing it with a vinyl compound of the formula $CH_2=CH-CHR_6R_7$ wherein $R_6$ and $R_7$ together form a 5- or 6-membered saturated, unsaturated or aromatic ring or independently represent an alkyl group comprising 1 to 4 carbon atoms, in the presence of the cocatalysts and the external donor, wherein the slurry reactor product is further polymerized in the presence of the catalyst system in said first GPR transferring the first GPR product into a $2^{nd}$ GPR producing an ethylene/propylene-copolymer (B) in the polymer matrix (A) in the presence of the catalyst system in said $2^{nd}$ GPR transferring the $2^{nd}$ GPR product into a $3^{rd}$ GPR and further producing an ethylene/propylene-copolymer (B) in the polymer matrix (A) in the presence of the catalyst system in said $3^{rd}$ GPR, said ethylene/propylene copolymers having the same composition ratios and recovering the polymer product for further processing, yielding a polypropylene polymer matrix (A) containing said ethylene/propylene copolymers (B) having the same composition ratios, respectively having same ethylene content and intrinsic viscosities, so that an unimodal rubber composition is obtained adding (C) 0-15 wt % of an elastomeric ethylene/alpha-olefin random copolymer and (D) 3-25 parts per weight of inorganic filler.

2. Process according to claim 1, wherein the catalyst system used comprises (i) a Ziegler-Natta procatalyst which contains a trans-esterification product of a lower alcohol and a phthalic ester as internal donor and
(ii) an organometallic cocatalyst and
(iii) an external donor represented by formula (III)

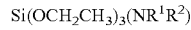

wherein $R^1$ and $R^2$ can be the same or different a represent a hydrocarbon group having 1 to 12 carbon atoms or formula (IV)

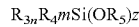

wherein $R_3$ and $R_4$ are identical or different hydrocarbon residues, $R_5$ is methyl or ethyl, z is 2 or 3; m is 0 or 1; n is 0 or 1; with the proviso that n+m+z=4, said procatalyst being modified by polymerizing it with a vinyl compound of the formula $CH_2=CH-CHR_6R_7$ wherein $R_6$ and $R_7$ together form a 5- or 6-membered saturated, unsaturated or aromatic ring or independently represent an alkyl group comprising 1 to 4 carbon atoms, in the presence of the cocatalysts and the external donor.

3. Process according to claim 2, wherein the vinyl compound used for modifying the procatalyst is vinyl cyclohexane.

4. Process according to claim 2, wherein said z is 2.

* * * * *

UNITED STATES PATENT AND TRADEMARK OFFICE
CERTIFICATE OF CORRECTION

PATENT NO. : 8,569,412 B2  
APPLICATION NO. : 13/261048  
DATED : October 29, 2013  
INVENTOR(S) : Posch et al.

Page 1 of 1

It is certified that error appears in the above-identified patent and that said Letters Patent is hereby corrected as shown below:

In the Specification:

Column 1, Line 67, add -- $\geq$ -- before "80 g/10 min";

Column 3, Line 2, "i.a." should be -- i.e. --;

Column 4, Line 38, add -- $\geq$ -- before "110 g/10 min";

Column 4, Line 56, add -- g -- after "$\geq$3.3 dl/";

Column 9, Line 18, "dialkylphthalat" should be -- dialkylphthalate --;

Column 11, Line 48, "t-roll" should be -- 2-roll --;

In the Claims:

Column 16, Line 61, In formula, subscript "n" should not be subscript;

Column 16, Line 61, In formula, "OR6" should be -- OR5 --;

Column 18, Line 12, In formula, "n" should not be subscript.

Signed and Sealed this  
Second Day of September, 2014

Michelle K. Lee  
*Deputy Director of the United States Patent and Trademark Office*